United States Patent [19]

Thulliez et al.

[11] Patent Number: 6,054,538
[45] Date of Patent: *Apr. 25, 2000

[54] COMPOSITIONS BASED ON VINYLIDENE FLUORIDE COPOLYMERS INCLUDING POLYVINYL CHLORIDE AND THEIR USE IN CABLE MANUFACTURE

[75] Inventors: Vincent Thulliez, Brussels; Yves-Julien Lambert, Chaumont-Gistoux; Guy Laurent, Vedrin; Fredy Declerck, Grimbergen, all of Belgium

[73] Assignee: Solvay, S.A., Brussels, Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/871,766

[22] Filed: Jun. 9, 1997

Related U.S. Application Data

[63] Continuation of application No. 08/546,845, Oct. 23, 1995, abandoned.

[30] Foreign Application Priority Data

Oct. 24, 1994 [BE] Belgium ................................ 09400957

[51] Int. Cl.[7] .......................... C08L 27/16; C08L 27/06; C08L 33/10
[52] U.S. Cl. .......................... 525/199; 525/227; 525/239
[58] Field of Search ..................... 525/199, 227, 525/239

[56] References Cited

U.S. PATENT DOCUMENTS

| | | | |
|---|---|---|---|
| 5,130,201 | 7/1992 | Yoshimura et al. | 428/416 |
| 5,270,115 | 12/1993 | Mascia | 428/422 |
| 5,322,899 | 6/1994 | Grunewalder et al. | 525/199 |

FOREIGN PATENT DOCUMENTS 0294755  12/1988  European Pat. Off. .

OTHER PUBLICATIONS

Chemical Abstracts, vol. 122, No. 16, Apr. 17, 1995, Columbus, Ohio, US; abstract No. 189846, "flame– and impact resistant vinyl chloride polymer compositions" (JP–A–6248141).

*Primary Examiner*—Jeffrey C. Mullis
*Attorney, Agent, or Firm*—Venable; George H. Spencer; Marina V. Schneller

[57] ABSTRACT

The compositions based on copolymers of vinylidene fluoride and of ethylenically unsaturated fluorine-containing comonomers, containing at least 75% by weight of vinylidene fluoride include polyvinyl chloride and an effective quantity of a methacrylic polymer (producing compatibility). These compositions exhibit in particular improved dielectric properties, which makes them particularly advantageous for sheathing electrical cables.

25 Claims, No Drawings

COMPOSITIONS BASED ON VINYLIDENE FLUORIDE COPOLYMERS INCLUDING POLYVINYL CHLORIDE AND THEIR USE IN CABLE MANUFACTURE

This application is a continuation of application Ser. No. 08/546,845, filed Oct. 23, 1995, now abandoned.

FIELD OF THE INVENTION

The present invention relates to compositions based on vinylidene fluoride copolymers and polyvinyl chloride and to their use for sheathing electrical cables. It relates more particularly to such compositions additionally containing a methacrylic polymer.

TECHNOLOGY REVIEW

In patent application EP-A-0 294 755 there is a description of compositions for coating various substrates with a view to producing adherent and hard coatings exhibiting an excellent chemical resistance, which include, per 100 parts by weight in all, (A) from 10 to 95 parts of vinylidene fluoride resin, (B) from 1 to 80 parts of a resin which has a poor compatibility with the vinylidene fluoride resin and (C) from 1 to 30 parts of resin which has an excellent compatibility with resins (A) and (B), generally an acrylic or methacrylic resin. Polyvinyl chloride is cited among the resins (B) that can be employed in the compositions, but all the examples of embodiment use a resin (B) of curable type containing reactive functional groups, such as an epoxy resin, a phenolic resin and the like. These compositions are applied to the substrates in the form of solution or of dispersions in organic solvents and are then baked at elevated temperature to form an adherent film on the substrate.

SUMMARY OF THE INVENTION

The objective of the present invention is to provide compositions based on vinylidene fluoride copolymers which have improved dielectric properties.

DETAILED DESCRIPTION OF THE INVENTION

It is well known that vinylidene fluoride polymers, homo- and copolymers with halogenated comonomers, exhibit a high limiting oxygen index and a low flame propagation, in other words a high fire resistance and, furthermore, a very low ability to generate smoke, that is to say they emit very little smoke when they burn. With these properties, which are advantageous from the viewpoint of fire resistance, they combine a high resistance to thermal aging, that is to say that their mechanical properties such as the tensile strength and the elongation at break are not appreciably altered after prolonged thermal aging at temperatures above 100° C.

It is precisely because of this combination of advantageous properties that the vinylidene fluoride polymers and still more particularly its copolymers with halogenated comonomers, which are generally more flexible than the homopolymers, find applications in the field of the sheathing of electrical cables and of optical fibres. Nevertheless, vinylidene fluoride polymers exhibit dielectric properties which are not optimal and in particular a dielectric constant and dielectric losses at high frequency (that is to say higher than 1 MHz) which are relatively high.

Vinyl chloride polymers, more specifically polyvinyl chloride, exhibit more advantageous dielectric properties than vinylidene fluoride polymers and, in particular, a dielectric constant and dielectric losses at high frequency (>1 MHz) which are less high. For this reason, they have also already been proposed for the sheathing of electrical cables. Nevertheless, vinyl chloride polymers exhibit a fire resistance, especially a lower limiting oxygen index, and hence a higher flammability, than vinylidene fluoride polymers. Furthermore, when they burn they emit much more smoke than vinylidene fluoride polymers. In addition, appreciable quantities of plasticizers must generally be incorporated into them in order to give them the necessary flexibility for cable sheathing, and this generally has the effect of further decreasing the fire resistance and of increasing the ability to generate smoke.

The objective of the present invention is to provide compositions based on vinylidene fluoride copolymers and on vinyl chloride polymers that can be employed, in particular, for sheathing electrical cables, which do not exhibit any of the abovementioned disadvantages and which, in particular, combine outstanding dielectric properties, resistance to thermal aging and fire resistance.

To this end the invention relates to compositions based on vinylidene fluoride copolymers exhibiting improved dielectric properties, characterized in that they consist essentially of a thermoplastic copolymer of vinylidene fluoride and of ethylenically unsaturated fluorine-containing comonomers, containing at least 75% by weight of monomer units derived from vinylidene fluoride and of polyvinyl chloride, and of an effective quantity of methacrylic polymer.

The methacrylic polymer present in the compositions according to the invention is chosen from methyl methacrylate homopolymers and copolymers which have a preponderant content of methyl methacrylate with alkyl acrylates and/or methacrylates. Advantageous results are obtained with copolymers of methyl methacrylate and of $C_2$–$C_6$ alkyl acrylates. Outstanding results are obtained with copolymers of methyl methacrylate and of $C_2$–$C_4$ alkyl acrylates such as, for example, butyl acrylate.

The methyl methacrylate content of the copolymers is generally at least approximately 55% by weight and preferably at least approximately 60% by weight. It generally does not exceed approximately 90% by weight; in most cases it does not exceed 80% by weight.

The average molecular weight of the methacrylic polymer is advantageously such that a solution containing 2 g of polymer per liter of cyclohexanone exhibits a relative viscosity of at least 1 at 25° C. The relative viscosity at 25° C. of such a solution generally does not exceed 3. The relative viscosity, at 25° C., of a solution containing 2 g of polymer per liter of cyclohexanone is preferably approximately between 1.4 and 2.2.

An effective quantity of methacrylic polymer is intended to mean a quantity that is at least sufficient to ensure that compatibility is obtained between the vinylidene fluoride copolymer and the polyvinyl chloride, which is such that it is reflected, for example, in the presence of a single glass transition temperature peak for the mixture. The optimum quantities of methacrylic polymer depend essentially on the chemical composition of the methacrylic polymer and on the respective contents of vinylidene fluoride copolymer and of polyvinyl chloride of the compositions according to the invention. They will therefore advantageously be determined experimentally in each particular case. To give an idea, the quantity of methacrylic polymer is generally at least approximately 2 parts by weight and, in most cases, at least approximately 4 parts by weight per 100 parts by weight of the total of vinylidene fluoride copolymer and of polyvinyl chloride. This quantity generally does not exceed approximately 20 parts by weight; in most cases it does not exceed approximately 15 parts by weight per 100 parts by weight of the total of vinylidene fluoride copolymer and of polyvinyl chloride.

The thermoplastic copolymers of vinylidene fluoride, which are referred to hereinafter as coPVDF, used in the compositions of the invention, advantageously have a melting temperature of at least approximately 130° C. and, preferably, of at least approximately 150° C. and still more particularly of at least 165° C. Hexafluoropropylene and chlorotrifluoroethylene may be mentioned in particular as examples of fluorine-containing copolymers that can be employed, the second being preferred.

According to an advantageous alternative form of the present invention the coPVDF is a copolymer of vinylidene fluoride and of hexafluoropropylene, containing approximately from 5 to 20% by weight of hexafluoropropylene and still more particularly approximately from 8 to 15% by weight. These latter copolymers have melting temperatures of approximately 160 to approximately 135° C.

According to a particularly advantageous alternative form of the present invention the coPVDF is a copolymer of vinylidene fluoride and of chlorotrifluoroethylene, containing approximately from 10 to 25% by weight of chlorotrifluoroethylene and still more particularly approximately from 12 to 22% by weight. These particularly preferred latter copolymers have melting temperatures of approximately 170 to approximately 165° C.

The method of preparation of the fluorine-containing copolymers is not critical. They may therefore be manufactured by any of the usual known processes for preparing vinylidene fluoride copolymers, such as, for example, polymerization in aqueous emulsion, in aqueous suspension or in aqueous dispersion, also called aqueous microsuspension. Furthermore, they may be homogeneous (uniform distribution of the monomer units of the comonomer within the polymer chains) or heterogeneous (nonuniform distribution of the said monomer units within the polymer chains of the copolymer).

The copolymers preferably used in the compositions according to the invention are advantageously produced by copolymerization in aqueous suspension with the use of all of the vinylidene fluoride and of the chlorotrifluoroethylene at the beginning of the copolymerization (which results in heterogeneous copolymers being obtained) and in the presence of the usual ingredients in polymerization of this type, namely essentially a dispersing agent (such as, for example, ethyl hydroxyethyl cellulose), an oil-soluble initiator (such as, for example, tert-amyl perpivalate) and a chain-regulating agent (such as, for example, diethyl carbonate).

For the purpose of the present invention polyvinyl chloride is intended to denote homopolymers of vinyl chloride and its copolymers containing at most approximately 25% by weight of ethylenically unsaturated comonomers. These comonomers may be random copolymers, block copolymers or else graft copolymers on any polymer backbone. The following may be cited as examples of vinyl chloride comonomers: olefins such as ethylene and propylene and esters such as vinyl acetate and alkyl acrylates and methacrylates. The polyvinyl chloride used in the compositions according to the invention may be obtained by any known polymerization process such as polymerization in suspension or in aqueous emulsion, the difference being of no consequence. In most cases it has a K value (measured at 25° C. in cyclohexane at a concentration of 5 g/l) of approximately 50 to approximately 80.

The compositions according to the invention contain a preponderant quantity of coPVDF relative to the polyvinyl chloride (PVC). The weight ratio of the vinylidene fluoride copolymer to the polyvinyl chloride (coPVDF/PVC) that are present in the compositions is generally at least 1.20 and in most cases at least 1.5. Outstanding results are obtained with a coPVDF/PVC weight ratio of at least 1.8.

The coPVDF/PVC weight ratio generally does not exceed 9. In most cases this ratio does not exceed 6. Outstanding results are obtained with a coPVDF/PVC weight ratio not exceeding 4.

Besides the polymers of vinylidene fluoride (coPVDF) and of vinyl chloride (PVC) and the methacrylic polymer which are defined above and which represent the essential constituents of the compositions according to the invention, these compositions may, of course, contain any of the ingredients that are usual in the application of each of the constituent polymers of the compositions according to the invention (such as heat stabilizers, lubricants, plasticizers if appropriate), as well as various additives such as fillers, pigments and/or colorants, flame-retardants, smoke suppressors and the like.

It may be useful to incorporate small quantities of plasticizers in the compositions according to the invention with a view to avoiding any melt flow welding problem during processing. To do this, it is possible to employ one or more of the usual plasticizers for vinylidene fluoride and vinyl chloride polymers, such as, for example, dialkyl phthalates and sebacates (such as dioctyl and diethylhexyl phthalates and dibutyl sebacate) or else plasticizers of the type of polyesters derived from alkanedicarboxylic acids (such as adipic, azelaic or sebacic acids) and from diols, more especially from aliphatic diols, and which have a molecular mass of at least approximately 1500, preferably at least 1800, and which does not exceed approximately 5000, preferably lower than 3500. The plasticizers of the polyester type are particularly suitable. The quantity of plasticizer will generally not exceed 15% by weight of the total composition and in most cases will not exceed 12% by weight of the total composition.

While mixtures of vinylidene fluoride copolymers and of polyvinyl chloride which are free from methacrylic polymer are heterogeneous (dispersion of coarse nodules of polyvinyl chloride in the continuous phase of vinylidene fluoride copolymer) and provide shaped articles exhibiting a rough surface appearance, the compositions according to the invention are perfectly homogeneous and provide shaped articles exhibiting an attractive, smooth, glossy surface appearance.

A surprising effect of the compositions according to the invention lies in the fact that, by means of the incorporation of an effective quantity of methacrylic polymer, the compositions based on vinylidene fluoride copolymers including polyvinyl chloride in a minor quantity exhibit dielectric properties, in particular a dielectric constant and dielectric losses, which are substantially improved in comparison with compositions exclusively based on coPVDF and approaching those of compositions exclusively based on polyvinyl chloride.

The compositions according to the invention can be manufactured in any usual known manner for mixing polymers and their various processing ingredients and additives. They may, for example, be manufactured by mixing, in only one or a number of operations, all of the ingredients in a fast mixer at low temperature in order to produce non-pregelled compositions which are in the form of powder, generally called premixes. They can also be manufactured by mixing, in only one or a number of operations, all of the ingredients in an extruder in which the mixture is heated to a temperature that is at least equal to the melting temperature of the coPVDF in order to produce pregelled mixtures generally called compounds. The compositions according to the invention are advantageously in the form of compound (pregelled mixture) and in particular in the form of granules.

The compositions according to the invention may be processed by any of the conventional techniques for converting plastics as a melt, such as extrusion and injection. They are very particularly suitable for extrusion processing.

The shaped objects involving the compositions according to the invention exhibit a combination of advantageous properties. They combine outstanding dielectric properties with outstanding mechanical properties, including after thermal aging. Finally, while their fire resistance properties (flame propagation, smoke emission and the like) are somewhat reduced when compared with shaped objects involving compositions containing exclusively vinylidene fluoride copolymers, they are still amply sufficient to meet the generally severe safety standards that are imposed in the case of applications in the field of cable technology.

The compositions according to the invention are suitable for sheathing optical fibres. They are very particularly suitable for sheathing electrical cables such as communication cables. The use of the compositions according to the invention for sheathing electrical cables constitutes another aspect of the present invention.

EXAMPLES

The examples which follow illustrate the invention.

Example 1

This example relates to a composition in which the vinylidene fluoride copolymer is a copolymer of vinylidene fluoride and of chlorotrifluoroethylene, containing 15% by weight of chlorotrifluoroethylene and exhibiting a melting temperature of 169° C. and an MFI of approximately 5 g/10 min at 230° C. under 2.16 kg (ASTM D 1238).

The vinyl chloride polymer is a vinyl chloride homopolymer exhibiting a K value (measured at 25° C. in cyclohexanone at a concentration of 5 g/l) of 71.

The methacrylic polymer is a copolymer of methyl methacrylate and of butyl acrylate, containing 63% by weight of methyl methacrylate and whose solution at a concentration of 2 g/liter of cyclohexanone exhibits a relative viscosity of 1.96 at 25° C.

The composition illustrating the invention was prepared by extrusion in a twin-screw extruder at 180–200° C. of 60 parts by weight of granules of formulated VF2-CTFE copolymer (the detailed composition of which appears below=composition A) with 40 parts by weight of granules of formulated polyvinyl chloride (the detailed composition of which also appears below=composition B) and with 10 parts of the methacrylic copolymer (as powder), the composition of which appears below.

Composition A (parts by weight)

| | |
|---|---|
| VF2-CTFE copolymer | 100 |
| calcium molybdate | 5 |
| precipitated calcium carbonate coated with stearic acid | 0.1 |
| polyethylene wax | 0.2 |

Composition B (parts by weight)

| | |
|---|---|
| polyvinyl chloride | 100 |
| phthalates (plasticizers) | 46 |
| thermal stabilizers (containing lead) | 6 |
| kaolin (filler) | 7 |
| polyethylene wax | 0.7 |
| antimony oxide | 4 |

The granules extruded from 60 parts by weight of composition A, 40 parts by weight of composition B and 10 parts by weight of the methacrylic copolymer contain 11 parts by weight of methacrylic polymer per 100 parts by weight of the total of coPVDF and of PVC and have a coPVDF/PVC weight ratio of 2.3.

Plaques of 2-mm thickness were pressed (stock temperature: approximately 200° C.) from these granules, and the dielectric properties (dielectric constant and loss) and fire resistance (LOI=limiting oxygen index) and smoke emission (maximum density with and without flame) were evaluated according to the normal standards (ASTM). The results of these evaluations are recorded in the appended Table.

Furthermore, tapes of 2-mm thickness were extruded from these granules in a single-screw extruder (stock temperature: approximately 200° C.), on which the tensile mechanical properties (stress and elongation at break) were evaluated according to the normal standards (ASTM and UL). The results of these evaluations also appear in the appended Table. In the case of the mechanical properties the numerical values supplied constitute the average value evaluated on five test pieces.

Also appearing therein by way of comparison are the results evaluated by starting with composition A (cf. above) consisting essentially of coPVDF and free from PVC and methacrylic polymer.

The comparison of the results bears witness to the appreciable improvement in the dielectric properties with the tensile mechanical properties being maintained at values close to those of compositions exclusively based on vinylidene fluoride copolymer.

Example 2

This example relates to a composition in which the vinylidene fluoride copolymer is a copolymer of vinylidene fluoride and of chlorotrifluoroethylene, containing 20% by weight of chlorotrifluoroethylene and exhibiting a melting temperature of 165° C. and an MFI of approximately 5 g/10 min at 230° C. under 2.16 kg (ASTM D 1238).

The vinyl chloride polymer is a vinyl chloride homopolymer exhibiting a K value (measured at 25° C. in cyclohexanone at a concentration of 5 g/l) of 64.

The methacrylic polymer is identical with that used in Example 1.

The composition according to the invention was prepared by extrusion in a twin-screw extruder at 180–200° C. of 73 parts by weight of granules of formulated VF2-CTFE copolymer (the detailed composition of which appears below=composition A) with 27 parts by weight of granules of formulated polyvinyl chloride (the detailed composition of which also appears below=composition B).

Composition A (parts by weight)

| VF2-CTFE copolymer | 100 |
|---|---|
| calcium molybdate | 0.45 |
| precipitated calcium carbonate coated with stearic acid | 0.15 |
| polyethylene wax | 0.30 |
| adipic polyester of average molecular mass of approximately 3000 (plasticizer) | 7 |
| methacrylic copolymer | 7 |

Composition B (parts by weight)

| polyvinyl chloride | 100 |
|---|---|
| thermal stabilizers (containing lead) | 10 |
| calcium stearate | 2 |
| hydrogenated castor oil | 3 |
| calcium carbonate | 20 |

The granules thus extruded contain approximately 5 parts by weight of methacrylic copolymer per 100 parts by weight of the total of coPVDF and of PVC and exhibit a coPVDF/PVC weight ratio of approximately 3.3.

Plaques of 2-mm thickness were pressed (stock temperature: approximately 200° C.) from these granules, and the following dielectric properties were evaluated according to ASTM standard D 150:

| dielectric constant | at 1 MHZ: 5.2 |
|---|---|
|  | at 10 MHz: 4.1 |
| dielectric losses | at 1 MHz: 0.6 |
|  | at 10 MHz: 0.6. |

We claim:

1. A vinylidene fluoride copolymer composition consisting essentially of (1) a thermoplastic copolymer of vinylidene fluoride and ethylenically unsaturated fluorine-containing comonomers, including at least 75% by weight of monomer units derived from vinylidene fluoride, and of (2) polyvinyl chloride in a weight ratio of said vinylidene fluoride copolymer to said polyvinyl chloride of at least 1.2, and of (3) an effective quantity of a methacrylic polymer including at least 55% by weight of methyl methacrylate to ensure compatibility between said vinylidene fluoride copolymer and said polyvinyl chloride, wherein said copolymer composition exhibits a lower dielectric constant and lower dielectric losses at frequencies of 1 MHz and above than a composition consisting essentially of the vinylidene fluoride copolymer.

2. The composition according to claim 1, wherein methacrylic polymer is selected from the group consisting of methyl methacrylate homopolymers and copolymers of methyl methacrylate and $C_2$–$C_6$ alkyl acrylates and/or methacrylates.

3. The composition according to claim 2, wherein said methacrylic polymer is selected from the group consisting of copolymers of methyl methacrylate and $C_2$–$C_4$ alkyl acrylates.

4. The composition according to claim 1, wherein said methacrylic polymer contains at least approximately 55% by weight of MMA and not more than approximately 90% by weight of methyl methacrylate.

5. The composition according to claim 1, wherein said methacrylic polymer is present in a proportion of at least approximately 2 parts by weight and of not more than approximately 20 parts by weight per 100 parts by weight of the total of vinylidene fluoride copolymer and of polyvinyl chloride.

6. The composition according to claim 5, wherein said methacrylic polymer is present in a proportion of approximately 4 to approximately 15 parts by weight per 100 parts by weight of the total of vinylidene fluoride copolymer and of polyvinyl chloride.

7. The composition according to claim 1, wherein the weight ratio of vinylidene fluoride copolymer to polyvinyl chloride is at least 1.5 and less than 6.

TABLE

| Properties evaluated | Type of sample | Standard | Units | Example (invention) | Comparative Example (Composition A) |
|---|---|---|---|---|---|
| DIELECTRIC PROPERTIES | | | | | |
| Dielectric constant at 1 MHz | pressed plaque (2 mm) | ASTM D 150 | — | 4.6 | 7.5 |
| at 10 MHz | " | " | — | 3.8 | 4.9 |
| Dielectric losses at 1 MHz | " | " | — | 0.4 | 1.5 |
| at 10 MHz | " | " | — | 0.4 | 1.5 |
| TENSILE MECHANICAL PROPERTIES | | | | | |
| Stress at break | extruded tape (2 mm) | ASTM D 638 | MPa | 32 | 27 |
| % maintained after aging for 7 d at 136° C. | " | UL 444 | % | ≧90 | ≧90 |
| Elongation at break | " | ASTM D 638 | % | 427 | 565 |
| % maintained after aging for 7 d at 136° C. | " | UL 444 | % | ≧90 | ≧90 |
| FIRE-SMOKE PROPERTIES | | | | | |
| Limiting oxygen index (LOI) | pressed plaque (2 mm) | ASTM D 2863 | % | 38 | 100 |
| Maximum smoke density/g | | | | | |
| with flame | pressed plaque (2 mm) | ASTM E 662 | — | 11 | 10 |
| without flame | " | " | — | 13 | 7 |

8. The composition according to claim 1, wherein the vinylidene fluoride copolymer is chosen from copolymers of vinylidene fluoride and of chlorotrifluoroethylene, containing approximately from 10 to 25% by weight of chlorotrifluoroethylene and copolymers of vinylidene fluoride and of hexafluoropropylene containing approximately from 5 to 20% by weight of hexafluoropropylene.

9. The composition according to claim 8, wherein the vinylidene fluoride copolymer is a copolymer of vinylidene fluoride and of chlorotrifluoroethylene, containing approximately from 12 to 22% by weight of chlorotrifluoroethylene.

10. The composition according to claim 1, wherein the weight ratio of the vinylidene fluoride copolymer to the polyvinyl chloride is at least 1.2 and does not exceed 9.

11. A homogeneous composition containing a vinylidene fluoride copolymer and formed from a mixture comprising
a thermoplastic vinylidene fluoride copolymer, which contains at least 75% by weight of monomer units of vinylidene fluoride and which exhibits a dielectric constant and dielectric losses at frequencies of 1 MHZ and above;
a polyvinylchloride selected from the group consisting of homopolymers of vinyl chloride and copolymers of vinyl chloride containing at most approximately 25% by weight of at least one other ethylenically unsaturated comonomer,
wherein the weight ratio of thermoplastic vinylidene fluoride copolymer to polyvinylchloride is at least 1.20; and
a methacrylate selected from the group consisting of a homopolymer of methylmethacrylate and a copolymer of methyl methacrylate containing at least 55% by weight methylmethacrylate,
wherein the quantity of methacrylate ranges from 2–20 parts by weight per 100 parts by weight of the combined weight of polyvinylchloride and thermoplastic vinylidene fluoride copolymer,
wherein the homogeneous composition exhibits a lower dielectric constant and lower dielectric losses than said thermoplastic vinylidenefluoride copolymer.

12. The homogeneous composition of claim 11, wherein the amount of methacrylate is at least sufficient to insure that the homogeneous composition exhibits a single glass transition temperature peak.

13. The homogeneous composition of claim 11, wherein the composition comprises a melt.

14. The homogenous composition of claim 11, which consists essentially of said thermoplastic vinylidene fluoride copolymer, said methacrylate, and said polyvinyl chloride.

15. The composition of claim 11, in the extruded form.

16. The composition of claim 11, wherein the copolymer of methylmethacrylate further comprises an acrylate monomer selected from $C_2$–$C_6$ alkyl acrylate.

17. The composition of claim 11, wherein the copolymer of methylmethacrylate comprises $C_2$–$C_4$ alkyl acrylates.

18. The composition of claim 11, wherein the methacrylate is present in a proportion of approximately 4 to approximately 15 parts by weight per 100 parts by weight of the total of vinylidene fluoride copolymer and of polyvinylchloride.

19. The composition of claim 11, wherein said thermoplastic vinylidene copolymer is selected from the group consisting of (1) a copolymer of vinylidene fluoride and of chlorotrifluoroethylene, which comprises approximately 10 to 25% by weight of chlorotrifluoroethylene and copolymers of vinylidene fluoride and (2) a copolymer of vinylidene fluoride and of hexafluoroprolylene comprising approximately from 5 to 20% by weight of hexfluoropropylene.

20. The composition of claim 11, wherein said thermoplastic vinylidene fluoride copolymer comprises approximately 12 to 22% by weight of chlorotrifiuoroethylene.

21. The composition of claim 11,
wherein the weight ratio of thermoplastic vinylidene fluoride copolymer to polyvinylchloride does not exceed 9.

22. The composition of claim 11,
wherein the weight ratio of thermoplastic vinylidene fluoride copolymer to polyvinylchloride is at least 1.5 and less than 6.

23. The composition of claim 11, wherein said lower dielectric losses are measurable at frequencies of 1 MHz and above.

24. A sheath for electrical cable comprising the composition of claim 11.

25. A sheath for optical fibers comprising the composition of claim 11.

* * * * *